United States Patent [19]

Gower et al.

[11] 3,757,572

[45] Sept. 11, 1973

[54] COMPRESSION TESTING METHOD

[75] Inventors: Bob G. Gower; Frederick L. Voelz, both of Harvey, Ill.

[73] Assignee: Atlantic Richfield Company, New York, N.Y.

[22] Filed: Apr. 14, 1972

[21] Appl. No.: 244,244

[52] U.S. Cl. .................................................. 73/116
[51] Int. Cl. ........................................... G01m 15/00
[58] Field of Search.......................... 73/116, 23, 118

[56] References Cited
UNITED STATES PATENTS

| | | | |
|---|---|---|---|
| 3,472,067 | 10/1969 | Chew | 73/116 |
| 3,211,534 | 10/1965 | Ridgway | 23/277 |

*Primary Examiner*—Jerry W. Myracle
*Attorney*—Thomas J. Clough et al.

[57] ABSTRACT

Disclosed is a method for determining whether a combustion chamber of an internal combustion engine is compression sound. The method involves removing individual combustion chambers from service, determining the exhaust gas carbon monoxide concentration with individual chambers removed from service and comparing these carbon monoxide concentrations. An individual combustion chamber is compression unsound if the exhaust gas carbon monoxide concentration with it removed from service is substantially less than the maximum carbon monoxide concentration obtained with any other combustion chamber removed from service. Also disclosed is a method for balancing the air-fuel composition supplied to different banks of combustion chambers. This method involves removing from service one combustion chamber from each bank, analyzing the engine exhaust gases for carbon monoxide with the chamber removed from service and comparing these carbon monoxide concentrations. A balanced air-fuel composition is supplied to different banks of combustion chambers when the exhaust gas carbon monoxide concentrations obtained by removing one chamber from each bank are substantially the same.

12 Claims, No Drawings

COMPRESSION TESTING METHOD

The present invention relates to maximizing the operating efficiency of the internal combustion engine. More particularly, this invention relates to a method for determining whether the combustion chambers of an internal combustion engine are compression sound as well as determining whether each chamber is being supplied with the same air-fuel composition.

The internal combustion engine is used to power, among other things, practically all of the transportation vehicles in use today. For example, this type of power system is used in over 90 million automobiles in the United States alone. With the automobile population continually increasing, the problem of maintaining each of the automobile engines at maximum operating efficiency is becoming more and more difficult. This problem is accentuated by the limited supply of trained mechanics and technicians. Many of the current engine diagnostic procedures are expensive, cumbersome and time-consuming. This further limits the number of automobiles which can be properly maintained as well as inconveniencing the auto owner to the point where he may actually avoid needed engine maintenance. Therefore, it would be advantageous to develop inexpensive and quick diagnostic methods for internal combustion engines.

The internal combustion engine manufactures useful power from the explosive combustion of fuel, normally of the hydrocarbon type such as natural gas, gasoline, kerosene, diesel fuel and the like, and oxygen, normally taken from air. The internal combustion engine includes an air intake system which, in turn, includes a carburetor where the air and fuel are intimately mixed prior to combustion. Combustion takes place in combustion chambers, normally at super-atomspheric pressures. Thus, in order to maximize operating efficency, the combustion chambers of the internal combustion engine should be able to withstand these super-atmospheric pressures, i.e., should be compression sound. Since maximum engine operating efficiency requires the combustion chambers to be compression sound, it would be advantageous to provide a method for easily determining whether a given combustion chamber of an internal combustion engine is compression sound.

In addition, many engines are equipped with carburetors which independently feed air-fuel mixtures to different combustion chambers or banks of combustion chambers of the internal combustion engine. In order to maximize engine operating efficiency, it is desirable to balance such a carburetor so that each of the engine's combustion chambers is supplied with substantially the same air-fuel composition. Therefore, it would be advantageous to provide a method for easily determining whether a carburetor is supplying the same air-fuel composition to each bank of combustion chambers. This problem has been further complicated by the introduction of exhaust gas recycle which has made various prior art methods for balancing such carburetors ineffective. Therefore, it would be advantageous to provide a method for balancing a carburetor associated with an internal combustion engine equipped with exhaust gas recycle means.

Therefore, it is an object of the present invention to provide a method for determining whether a combustion chamber of an internal combustion engine is compression sound.

Another object of the present invention is to provide a method for determining whether each bank of combustion chambers of an internal combustion engine is being supplied with substantially the same air-fuel composition.

A further object of the present invention is to provide a method for balancing the air-fuel composition supplied to each bank of combustion chambers of an internal combustion engine.

An additional object of the present invention is to provide a method for determining whether each bank of combustion chambers of an internal combustion engine equipped with exhaust gas recycle means is being supplied with substantially the same air-fuel composition. Other objects and advantages of the present invention will become apparent hereinafter.

In one aspect, the present invention is a method for determining whether at least one combustion chamber is compression unsound, said combustion chamber being one of at least two combustion chambers of an internal combustion engine which are supplied with substantially the same air-fuel composition, which comprises:

1. placing said engine in operation under essentially no load conditions on the idle carburetion circuit of said engine and at normal operating temperatures of said engine;
2. removing one of said combustion chambers from service, said remaining combustion chambers being in service;
3. analyzing for the carbon monoxide concentration of the exhaust gases from said engine collected while said engine is being operated as in step (1), provided that one of said combustion chambers is removed from service;
4. repeating steps (2) and (3) as many times as said engine has additional combustion chambers, provided that each time steps (2) and (3) are carried out a different combustion chamber is removed from service; and
5. comparing the carbon monoxide concentrations obtained in step (3) and (4), said combustion chamber being compression unsound if the carbon monoxide concentration obtained while said combustion chamber is removed from service is substantially less than the maximum carbon monoxide concentration obtained in steps (3) and (4).

Typical engine speeds on the idle carburetion circuit of the engine range from about 400 rpm to about 1,100 rpm, preferably from about 400 rpm to about 900 rpm. When a combustion chamber is removed from service, the engine speed normally changes, e.g., drops. Although the engine speed may be adjusted to the level existing with all the combustion chambers in service, it is preferred that no engine speed adjustment be made as individual combustion chambers are removed from service. While practicing the method of the present invention, the engine is run at normal operating conditions to insure consistent results. In order to achieve normal operating temperatures the engine may be run for a sufficiently long time so that the engine choke system, if any, is completely open and does not restrict the flow of combustion air. In any case, normal engine operating temperatures vary depending on the type of engine, air-fuel ratio, thermostating, etc. Generally, normal operating temperatures for internal combustion engines are from about 170° F. to about 240° F., (engine block temperatures).

As stated previously, it has been discovered that a combustion chamber is compression unsound if the carbon monoxide concentration obtained with that combustion chamber removed from service is substantially less than the maximum carbon monoxide concentration obtained when any other of the engine's combustion chambers is removed from service. By the term "substantially less" is meant a carbon monoxide concentration reduction of at least about 15 percent. When the method of this invention determines that a combustion chamber is compression unsound, the defect may be more specifically diagnosed in order to improve the compression soundness of the chamber. Conditions which may result in compression unsoundness include faulty piston rings, defective valves and/or valve seats and the like malfunctions.

In many instances, the combustion chambers of an internal combustion engine are divided into two or more banks. Each individual bank of combustion chambers is supplied with an air-fuel composition from an independent, i.e., individually controlled, source within the engine's carburetion system. The combustion chambers in each bank are supplied with substantially the same air-fuel composition for combustion. However, in order to maximize engine operating efficiency, the air-fuel composition supplied to all combustion chamber banks should be substantially the same. The engine's carburetion system may have to be adjusted, i.e., balancing, in order to obtain air-fuel composition uniformity among the banks of combustion chambers.

Therefore, another aspect of the present invention involves a method of balancing the air-fuel composition supplied to different banks of combustion chambers of an internal combustion engine having at least two banks of combustion chambers all of which combustion chambers are compression sound, so that all of these different banks are supplied with substantially the same air-fuel composition. This method comprises:

1. placing said engine in operation under essentially no load conditions on the idle carburetion circuit of said engine and at normal operating temperatures of said engine;
2. removing at least one of said combustion chambers from one of said banks, said remaining combustion chambers being in service;
3. analyzing for the carbon monoxide concentration of the exhaust gases from said engine collected while said engine is being operated as in step (1), provided that at least one of said combustion chambers is removed from service;
4. repeating steps (2) and (3) as many times as said engine has banks of compression sound combustion chambers, provided that each time steps (2) and (3) are carried out a combustion chamber from a different bank is removed from service;
5. comparing the carbon monoxide concentrations obtained in steps (3) and (4);
6. adjusting the air-fuel composition to at least one of said banks, provided that the carbon monoxide concentrations obtained in steps (3) and (4) are not substantially the same;
7. repeating steps (2) through (5) until the carbon monoxide concentrations obtained in steps (3) and (4) are substantially the same.

By the term "substantially the same" is meant that the carbon monoxide concentrations obtained in steps (3) and (4) should preferably be within about 0.2 percent by volume, more preferably within about 0.1 percent by volume of each other, based upon the total engine exhaust gases.

In order to minimize the total amount of carbon monoxide emitted from the engine equipped with the carburetor being balanced, it is preferred to minimize the amount of fuel fed to the engine. Therefore, it is preferred that step (6) of the above method comprise reducing the amount of fuel in the air-fuel composition to at least one of the banks of combustion chambers which include combustion chambers which when removed from service in steps (2) and (4) produce an engine exhaust gas carbon monoxide concentration substantially greater than the minimum carbon monoxide concentration obtained in steps (3) and (4). Of course, the amount of fuel to the engine should not be reduced beyond the point at which the engine idles smoothly.

As noted previously, engine speed need not be adjusted to take into account the variation which results from removing individual combustion chambers from service, provided that the engine speed remains in the range of the idle carburetion circuit of the engine.

Step 6 of the above method of balancing the air-fuel composition supplied to different banks of combustion chambers of an internal combustion engine may comprise adjusting the source of the air or fuel or both within the engine's carburetion system. For example, the position of the idle adjust needle valve which controls the amount of fuel supplied to a bank of combustion chambers may be varied in order to adjust the air-fuel composition to that bank of chambers.

If the internal combustion engine being tested has at least two banks of combustion chambers being supplied with an air-fuel composition from an independent source within the engine's carburetion system, the two aspects of the present invention are preferably practiced together. For example, if such an engine is being tested, the compression soundness of each combustion chamber can be determined. If it is found that all the chambers are compression sound, the results of the carbon monoxide analyses can be used as a starting point toward the balancing of the engine's carburetion system to provide substantially the same air-fuel composition to all banks of combustion chambers. However, once the engine's combustion chambers have been found to be compression sound, it is preferred to adjust the engine's carburetor, for example, according to the method of U. S. Pat. No. 3,640,255, to minimize hydrocarbon exhaust emissions before balancing the air-fuel composition according to the method of the present invention.

Included among the internal combustion engines that may be used in the practice of this invention are those engines operating in connection with transportation means such as automobiles, trucks, etc. Internal combustion engines not associated with transportation means are also included. In fact, any internal combustion engine having two or more combustion chambers and/or two or more banks of combustion chambers including 2 cycle, 4 cycle, rotary piston driven engines and turbine engines may be used in the practice of the present invention. These engines must have at least two combustion chambers which are supplied with substantially the same air-fuel composition. These engines may have, for example, two, four, six, eight or more combustion chambers. in addition, it has been found that the method of the present invention is applicable to engines which are equipped with exhaust gas recirculation means. This is an important feature of the present invention since certain prior art methods of determining compression soundness and/or carburetor balance are ineffective when used on engines equpped with exhaust gas recirculation means.

The carbon monoxide content of the exhaust gases may be analyzed in any conventional manner known to the art. Included among these conventional analytical methods are: gas chromatography, mass spectrometry, and infra-red spectrometry. Because of the speed and accuracy of analysis, it is preferred to utilize infra-red spectrometry in the practice of the present invention. In particular, the use of non-dispersive infra-red (NDIR) analyzers is preferred in the practice of this invention. These infra-red analyzers operate on the known principle that carbon monoxide gas absorbs infra-red energy having a specific wave length. When infra-red energy is sent through a stream of engine exhaust gas, a certain amount of energy is absorbed by the carbon monoxide in the gas stream. The amount of absorbed energy has a direct relationship to the volume concentration of carbon monoxide in the exhaust gas. By comparing, normally using electronic means, the amount of infrared energy of the wave length absorbed by carbon monoxide remaining with the original amount of infra-red energy of this wave length, it is possible to determine the amount of carbon monoxide in the exhaust gas. This type of infra-red analyzer can be packaged as a relatively portable instrument. This analyzer mobility is an additional reason for preferring infrared spectrometry for analyzing the carbon monoxide concentration of engine exhaust gases.

When testing engines that are associated with automobiles and other motor vehicles, the preferred way to collect an exhaust gas sample for analysis is to sample the tail pipe effluent, i.e., the exhaust system effluent. In many instances, e.g., certain dual tailpipe configurations, engine exhaust systems vent gases to the atmosphere from individual combustion chambers or banks of combustion chambers. In these cases, it is preferred that the individual exhaust gas streams should be combined before sampling and analysis to efficiently obtain correct carbon monoxide concentrations of the total engine exhaust gases. Since the engine exhaust system, (i.e., muffler, tailpipe, etc.) is subject to great wear, the possibility of air leaks exists. Therefore, in order to insure the accuracy of the tailpipe effluent carbon monoxide analysis, it is preferred that if the tailpipe effluent is used as the source for exhaust gas samples, the engine exhaust system be tested for gas leaks at some point during the practice of this invention. The point at which the leak testing takes place is not critical to the present invention, although, for convenience and time-saving reasons, it is preferred that the leak testing occur at or prior to the time of the first carbon monoxide analysis.

The exhaust system leak testing can be accomplished in any conventional manner, for example, visual inspection of exhaust system. However, the preferred method of leak testing is to analyze the tailpipe effluent for oxygen concentration. It is well known that the exhaust gases from a conventional four cycle internal combustion engine (the standard automobile engine) contain between about 1 percent to about 2 percent by volume of oxygen. Any significant deviation, for example, at least about 3 percent by volume, from the upper limit of the above oxygen concentration range found in the tailpipe effluent indicates a leak in the engine exhaust system. Exhaust from engines which are equpped with air injection emission control devices normally contain between about 5 percent to about 20 percent by volume of oxygen, and, therefore, may be deemed insensitive to the "oxygen analysis" method for testing for air leaks. The oxygen concentration can be obtained by any conventional analytical method, such as amperometric methods, magnetic susceptibility methods, gas chromatography and mass spectrometry. The preferred methods of oxygen analysis are the amperometric methods.

The following examples illustrate more clearly the method of the present invention. However, these illustrations are not to be interpreted as specific limitations on this invention.

EXAMPLE I

This example illustrates the method of the present invention for determining the compression soundness of the combustion chambers of an internal combustion engine.

A 1965 Chevrolet automobile powered by a standard, 6 cylinder, 4 cycle internal combustion engine was selected for testing. All six combustion chambers were fed the same air-fuel composition. While performing the tests described hereinafter, the engine was run at no-load conditions and at normal operating temperatures so that the engine choke system did not restrict the flow of combustion air.

It was determined that the engine exhaust system was in tact and that, therefore, reliable samples of exhaust gas could be obtained by sampling the tailpipe effluent. With all six combustion chambers in operation, the engine was run on the idle carburetion circuit at approximately 500 rpm.

In order to remove individual combustion chambers from operation, the spark plug lead wire associated with the chamber was pulled. Each chamber in turn was removed from service. After each chamber was removed from service, the exhaust gases (tailpipe effluent) from the engine were analyzed for carbon monoxide concentration by means of a portable non-dispersive infra-red analyzer. The following results were obtained.

| | Chamber Removed From Operation In Exhaust Gas Carbon Monoxide Concentration | | | | | |
|---|---|---|---|---|---|---|
| | 1 | 5 | 3 | 6 | 2 | 4 |
| Exhaust Gas Carbon Monoxide Concentration, Vol.% | 3.2 | 2.7 | 3.3 | 2.7 | 2.9 | 3.1 |

These results indicated that chambers No. 5 and No. 6 were not compression sound. In order to verify this conclusion, a standard compression test on each of the chambers was performed with the following results:

| | CHAMBER | | | | | |
|---|---|---|---|---|---|---|
| | 1 | 5 | 3 | 6 | 2 | 4 |
| Chamber Pressure Found by Standard Compression Test, psi. | 175 | 125 | 180 | 120 | 185 | 180 |

Thus, the conclusion obtained by the method of the present invention that chambers No. 5 and No. 6 were compression unsound is verified by the standard compression test. However, the method of the present invention has the advantage of being quick, uncomplicated and not requiring great expertise on the part of the person who performs the test. The standard compression test on the other hand requires sophisticated equipment, is relatively tedious to perform and requires a substantial degree of expertise to perform with accuracy and safety.

EXAMPLE II

This example illustrates the use of the present invention in balancing a carburetor so that both banks of engine combustion chambers receive the same air-fuel composition.

A 1972 Ford automobile powered by a standard 4 cycle, V8 cylinder internal combustion engine equipped with exhaust gas recycle means was selected for testing. The engine was equipped with a carburetor having two idle adjust needle valves. One idle adjust needle valve regulated the flow of fuel and, therefore, the air-fuel composition to combustion chambers 1, 4, 6 and 7 while the other idle adjust needle valve regulated the flow of fuel to chambers 2, 3, 5 and 8. Prior to balancing the carburetor, the engine was run at no-load conditions on the idle carburetion circuit and at an engine speed of 600 rpm. for a sufficient period fo time so that normal operating temperatures were obtained and the engine choke system did not restrict the flow of combustion air. It was determined that the engine exhaust system was intact and that, therefore, reliable samples of engine exhaust gas could be obtained by sampling the tail pipe effluent. In addition, using the method of the present invention as illustrated in Example I, it was determined that all of the engine's combustion chambers were compression sound.

While operating the engine at the above-described conditions, each idle adjust needle valve in turn was lightly seated and then turned out 4 full turns. With both needle valves out 4 full turns, the exhaust gases (tailpipe effluent) from the engine were sampled and analyzed for hydrocarbon concentration by means of a portable non-dispersive infra-red analyzer. These needle valves, each were turned in approximately ¼ turn at a time alternately until the exhaust gas hydrocarbon concentration stopped decreasing and, in fact, increased by about 20 ppm. At this point, each needle valve was turned out ⅛ turn and the exhaust gas hydrocarbon concentration was analyzed to be 70 ppm. Using a portable non-dispersive infrared analyzer, the exhaust gas carbon monoxide concentration at this point was determined to be 0.7 percent by volume. With the idle adjust needle valves positioned as noted above, the carburetor was properly tuned, e.g., the engine idled smoothly and emitted small amounts of hydrocarbons and carbon monoxide.

One combustion chamber from each bank of chambers was removed from operation by pulling the spark plug lead wire associated with the chamber. The removal from service of one combustion chamber caused a variation in engine speed. However, the engine was still operating on the idle carburetion circuit and no engine speed adjustment was made. With one chamber eliminated from operation, the exhaust gas carbon monoxide concentration was determined. With chamber No. 1 removed from service, the exhaust gas carbon monoxide concentration was determined to be 0.5 percent by volume while the chamber No. 2 (from a different bank than chamber No. 1) out of operation, the exhaust gas carbon monoxide concentration was found to be 0.9 percent by volume. These results indicate that the two banks of combustion chambers are not being fed the same air-fuel composition. In order to remedy this situation, the needle valve controlling the air-fuel composition to the bank of chambers including chamber No. 2 was turned in 1/16 turn and the exhaust gas carbon monoxide concentration was determined to be 0.5 percent with all eight chambers operating. After making this adjustment one chamber from each bank was removed from service and exhaust gas carbon monoxide concentrations determined as above. These two carbon monoxide concentrations were determined to be substantially the same, about 0.5 percent by volume of the total exhaust gases. Therefore, the carburetor was balanced and the engine was emitting a very low 0.5 percent by volume carbon monoxide and, in addition, the engine was running very smoothly.

Certain previous methods for balancing carburetors are known to be ineffective when employed on carburetors associated with engines equipped with exhaust gas recycle means. One such method involves removing combustion chambers from service and observing the resulting drop in engine speed. This method is unreliable when used to balance carburetors associated with exhaust gas recycle means since it is known that removing a combustion chamber from such an engine from service may result in an increase in engine speed, a decrease in engine speed or no change in engine speed. However, as the above example clearly shows, the presence and operation of exhaust gas recycle means does not effect the accuracy of the present method for balancing carburetors.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for determining whether at least one combustion chamber is compression unsound, said combustion chamber being one of at least two combustion chambers of an internal combustion engine being supplied with substantially the same air-fuel composition, which comprises:
   1. placing said engine in operation under essentially no-load conditions on the idle carburetion circuit of said engine and at normal operating temperatures of said engine;
   2. removing one of said combustion chambers from service, said remaining combustion chambers being in service, steps (1) and (2) being performed in any chronological sequence;
   3. analyzing for the carbon monoxide concentration of the exhaust gases from said engine collected while said engine is being operated as in step (1), provided that one of said combustion chambers is removed from service;
   4. repeating steps (2) and (3) as many times as said engine has combustion chambers, provided that each time steps (2) and (3) are carried out a different combustion chamber is removed from service; and 5. comparing the carbon monoxide concentrations obtained in steps (3) and (4), said combustion chamber being compression unsound if the carbon monoxide concentration obtained while said combustion chamber is removed from service is substantially less than the maximum carbon monoxide concentration obtained in steps (3) and (4).

2. The method of claim 1 wherein step 1 comprises placing said engine in operation under essentially no load conditions at an engine speed within the range from about 400 to about 1,100 rpm and at normal operating temperatues of said engine.

3. The method of claim 1 wherein step 1 comprises placing said engine in operation under essentially no load conditions at an engine speed within the range from about 400 to about 900 rpm and at normal opeating temperatures of said engine.

4. The method of claim 3 wherein said combustion chamber is compression unsound if the carbon monoxide concentration obtained while said combustion chamber is removed from service is at least about 15% less than the maximum carbon monoxide concentration obtained in steps (3) and (4).

5. The method of claim 4 wherein said exhaust gases are analyzed for carbon monoxide concentration by means of infra-red spectrometry.

6. A method for balancing the carburetion system of an internal combustion engine having at least two banks of compression sound combustion chambers so that each bank is supplied with essentially the same air-fuel composition, each bank being supplied with an air-fuel composition from an independent source within said carburetion system which comprises:

1. placing said engine in operation under essentially no load conditions on the idle carburetion circuit of said engine and at normal operating temperatures of said engine;
2. removing at least one of said combustion chambers from one of said banks, said remaining combustion chambers being in service, steps (1) and (2) being performed in any chronological sequence;
3. analyzing for the carbon monoxide concentration of the exhaust gases from said engine collected while said engine is being operated as in step (1), provided that at least one of said combustion chambers is removed from service;
4. repeating steps (2) and (3) as many times as said engine has banks of compression sound combustion chambers, provided that each time steps (2) and (3) are carried out a combustion chamber from a different bank is removed from service;
5. comparing the carbon monoxide concentrations obtained in steps (3) and (4);
6. adjusting the air-fuel composition to at least one of said banks provided that the carbon monoxide concentrations obtained in steps (3) and (4) are not substantially the same;
7. repeating steps (2) through (6) until the carbon monoxide concentrations obtained in steps (3) and (4) are substantially the same.

7. The method of claim 6 wherein step (1) comprises placing said engine in operation under essentially no-load conditions at an engine speed within the range from about 400 to about 1,100 rpm and at normal operating temperatures of said engine.

8. The method of claim 6 wherein step (1) comprises placing said engine in operation under essentially no-load conditions at an engine speed within the range from about 400 to about 900 rpm and at normal operating temperatures of said engine.

9. The method of claim 7 wherein step (7) comprises repeating steps (2) through (6) until the carbon monoxide concentrations obtained in steps (3) and (4) are within 0.2 percent by volume of each other.

10. The method of claim 8 wherein step (7) comprises repeating steps (2) through (6) until the carbon monoxide concentrations obtained in steps (3) and (4) are within 0.1 percent by volume of each other.

11. The method of claim 9 wherein said exhaust gases are analyzed for carbon monoxide concentration by means of infra-red spectrometry.

12. The method of claim 10 wherein said exhaust gases are analyzed for carbon monoxide concentration by means of infra-red spectrometry.

* * * * *